US011553691B2

(12) United States Patent
Chen

(10) Patent No.: US 11,553,691 B2
(45) Date of Patent: Jan. 17, 2023

(54) ANTI-STUCK PET FEEDER

(71) Applicant: Dongguan Jiasheng Enterprise Co., Ltd, Guangdong (CN)

(72) Inventor: Silong Chen, Guangdong (CN)

( * ) Notice: Subject to any disclaimer, the term of this patent is extended or adjusted under 35 U.S.C. 154(b) by 498 days.

(21) Appl. No.: 16/736,073

(22) Filed: Jan. 7, 2020

(65) Prior Publication Data
US 2021/0204511 A1     Jul. 8, 2021

(51) Int. Cl.
*A01K 5/02* (2006.01)
(52) U.S. Cl.
CPC .................................. *A01K 5/0225* (2013.01)
(58) Field of Classification Search
CPC ...... A01K 5/0225; A01K 5/02; A01K 5/0258; A01K 5/0275; A01K 5/0285; A01K 5/0291
See application file for complete search history.

(56) References Cited

U.S. PATENT DOCUMENTS

| 6,789,503 | B1 * | 9/2004 | Gao | ..................... A01K 5/0291 |
| | | | | 119/51.11 |
| 9,560,834 | B2 | 2/2017 | Ma | |
| 2014/0090601 | A1 * | 4/2014 | Stone | ................... A01K 5/0275 |
| | | | | 119/51.01 |
| 2020/0100459 | A1 * | 4/2020 | Chen | ..................... A01K 5/0225 |
| 2020/0100460 | A1 * | 4/2020 | Chen | ..................... A01K 5/0225 |

FOREIGN PATENT DOCUMENTS

| CN | 105766678 | A | | 7/2016 | | |
| CN | 109197626 | A | * | 1/2019 | ............ | A01K 5/004 |
| CN | 110050719 | A | | 7/2019 | | |
| CN | 110050722 | A | * | 7/2019 | | |
| GB | 2166934 | A | * | 5/1986 | .......... | A01K 5/0291 |
| WO | WO-2016000081 | A1 | * | 1/2016 | .......... | A01K 11/006 |

* cited by examiner

*Primary Examiner* — Ebony E Evans

(57) ABSTRACT

The present invention provides an anti-stuck pet feeder, which includes a shell and a top cover, the shell has in a cavity. Its bottom of the shell is provided with an outlet. The upper part of the cavity is provided with a grain storage chamber, the lower part of the cavity is provided with a driving mechanism. The lower part of the grain storage chamber is provided with a rotor. The rotor includes a shaft and a main body arranged on the shaft, the side wall of the main body is uniformly distributed with blades. The grain storage chamber is provided with a grain-out channel below the blades, which communicates with the outlet. The driving mechanism is connected with the rotor and drives it to rotate, and the grain stored in the grain storage chamber is transported to the grain-out channel and fed through the outlet.

15 Claims, 7 Drawing Sheets

ANTI-STUCK PET FEEDER

TECHNICAL FIELD

The invention relates to the technical field of pet feeder, more particularly, to an anti-stuck pet feeder.

BACKGROUND OF THE INVENTION

Pets are friends of human beings. As they gradually enter thousands of households, pet supplies also flourished. One of the most important pet supplies is pet feeder. The exiting pet feeder cannot feed quantitatively. Feeding too much or too little food will affect pet health. The exiting pet feeder is easy to jam and does not work properly, resulting in the pet hungry. And the exiting pet feeder cannot store grain for long time, the grain in the pet feeder is easily spoiled by moisture and so on.

SUMMARY OF THE INVENTION

In order to overcome the shortcomings of the existing technology, the present invention provides an anti-stuck pet feeder, which is used to resolves the problem that the existing pet feeder is easy to jam, it cannot feed quantitatively, and the food is easy to wet.

The technical proposals of the present invention are as follows:

An anti-stuck pet feeder includes a shell and a top cover covered on the top of the shell, the shell has a cavity. Its bottom of the shell is provided with an outlet. The upper part of the cavity is provided with a grain storage chamber and the lower part of the cavity is provided with a driving mechanism. The lower part of the grain storage chamber is provided with a rotor. The rotor includes a shaft and a main body arranged on the shaft, the side wall of the main body is uniformly distributed with a plurality of blades. The grain storage chamber is provided with a grain-out channel below the blades, which communicates with the outlet. The driving mechanism is connected with the rotor and drives it to rotate, and the grain stored in the grain storage chamber is transported to the grain-out channel and fed through the outlet.

The grain storage chamber is fixedly provided with an anti-stuck comb. The anti-stuck comb has a comb back and comb teeth arranged on the comb back, and the free end of the comb teeth face to the blades and is close to them. When the rotor is rotated, the comb teeth hinder the passage of grain scattered over the blades, flattening the grain between the blades, thereby controlling the grain quantity and preventing the grain from being jammed.

The grain storage chamber is provided with a grain detecting element, the shell is provided with an indicator, the grain detecting element and the indicator are electrically connected, the detecting result can be showed by the indicator.

The top of the grain storage chamber is provided with an opening. The top cover is provided with a sealing groove, and a sealing ring is inserted in the sealing groove and matched with it. When the top cover is covered on the shell, the sealing ring surrounds its periphery of the opening to seal the inner cavity of the grain storage chamber.

The top cover is provided with a mesh plate which can be opened and closed, a chamber is formed between the mesh plate and the top cover, the chamber is used for placing desiccant.

The grain-out channel is provided with a jammed grain detecting element.

The middle part of the comb back is an arc part, both sides of the arc part extend a straight part. The straight part extends downwards to form the comb teeth.

The arc part is bridged over the main body part around the shaft so that the comb teeth are distributed on both sides of the main body.

The lower part of the grain storage chamber has a blanking gentle slope and a inclined straight slope, and the bottom of the inclined straight slope and that of the blanking gentle slope extend downward to form a grain discharging cylinder. The top wall of the grain discharging cylinder is tilted downward from the inclined straight slope to the blanking gentle slope direction, which is connected with the bottom of the inclined straight slope and the bottom of the blanking gentle slope, respectively. The bottom surface of the grain storage chamber is provided with a central hole. The bottom surface is communicated with the grain-out channel.

The main body is contained in the grain discharging cylinder. The lower end of the shaft is connected with the driving mechanism through the center hole.

The inclined straight scope is provided with a positioning hole. The upper end of the shaft is rotatably mounted on the positioning hole.

The section of the straight part is triangular. The straight part and the inclined straight slope are provided with buckle and slot matching with each other, respectively, thereby fixing the anti-stuck comb below the inclined straight slope.

The driving mechanism includes a motor, a pulley group, a vortex rod and a turntable assembly. The motor drives the pulley group, and the pulley group drives the vortex rod to rotate. The vortex rod drives the turntable assembly to rotate. The turntable assembly is connected with the rotor and drives it to rotate.

The turntable assembly includes a turntable, its periphery of the turntable is provided with grinding teeth, the middle of the turntable is provided with a matching cylinder. The matching cylinder is evenly distributed with vertical convex edges along its length and diameter. The lower end of the shaft is set in a criss-cross shape. The lower end of the shaft is inserted into the matching cylinder and clamped between the vertical convex edges so that the rotor can be driven when the turntable assembly is rotated.

The vortex rod is arranged on the one side of the turntable and engages with the turntable. The shell is provided with a first mounting frame and a second mounting frame, and its two ends of the vortex rod are bridged on the first mounting frame and the second mounting frame, respectively.

The bottom surface of the shell is provided with a pulley mounting frame. The pulley group is mounted on the pulley mounting frame. The pulley group includes a first pulley, a second pulley and a third pulley. The motor is mounted on the bottom surface of the shell. The motor drives the first pulley through a first belt. The first pulley is connected with the second pulley through a wheel shaft, which is mounted on the pulley mounting frame. The second pulley and the third pulley drive the third pulley through a second belt, and the third pulley is mounted on the vortex rod.

The shell is also provided with a protective cover, the protective cover is bridged on the pulley mounting frame to cover the third pulley and the vortex rod.

The shell is also provided with a battery chamber used for placing battery.

The shell is also provided with a USB interface used for connecting power.

The shell has a side wall and a front side wall. The top cover is covered on the side wall, and the two are matched with the front side wall to form the cavity.

The outlet is arranged in the lower part of the front side wall. A food plate is arranged below the outlet.

The beneficial effect of the invention is as follows: the pet feeder of the invention prevents the release of too much food at one time by setting an anti-stuck comb, thus achieving the effect of preventing the grain from being jammed and feeding quantitatively. The pet feeder has a jammed grain detecting element, which can monitor the jammed grain condition and further achieve the effect of preventing the grain from being jammed. The pet feeder prevents food moisture and contamination by sealing the grain storage chamber, and keeps food dry and clean, which is help to the long-term storage of food.

DETAILED DESCRIPTION OF EMBODIMENTS

In order to make the invention purpose, the technical scheme and the technical effect are more clearly understood, the invention is further explained in combination with the specific embodiment below. It should be understood that the specific embodiments described herein are used only for the interpretation of the present invention and not for limiting the invention.

Figure 1:
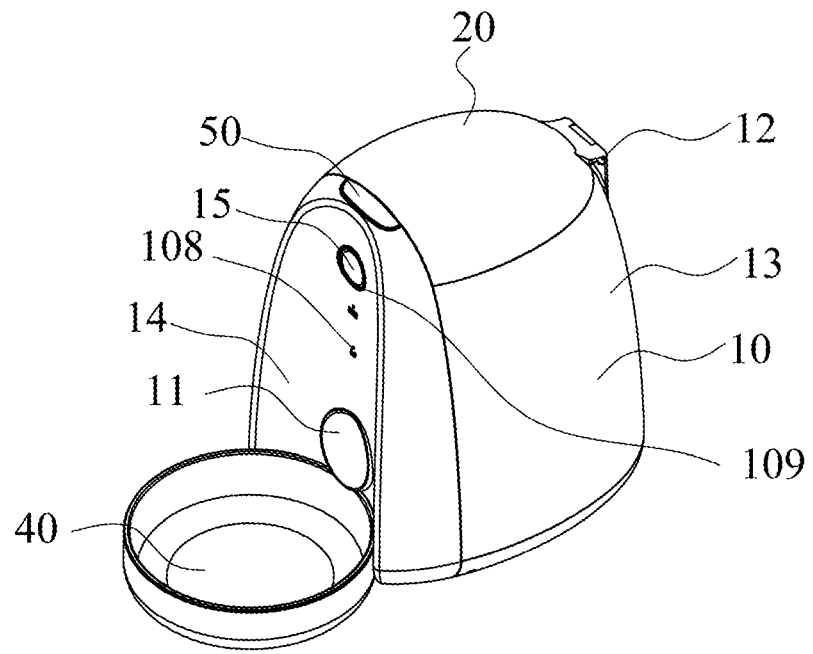
FIG. 1 is a perspective view of an anti-stuck pet feeder according to the present invention.
Figure 2:
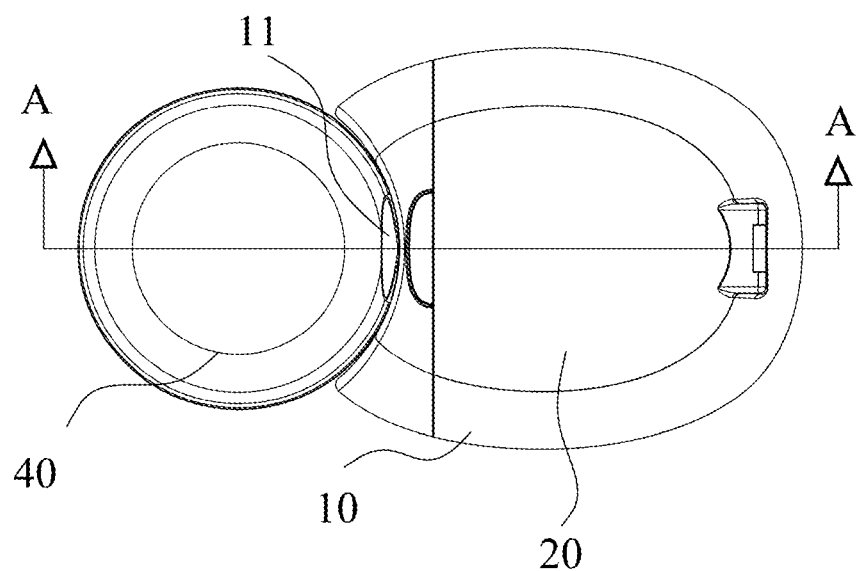
FIG. 2 is a top view of the anti-stuck pet feeder shown in FIG. 1.
Figure 3:
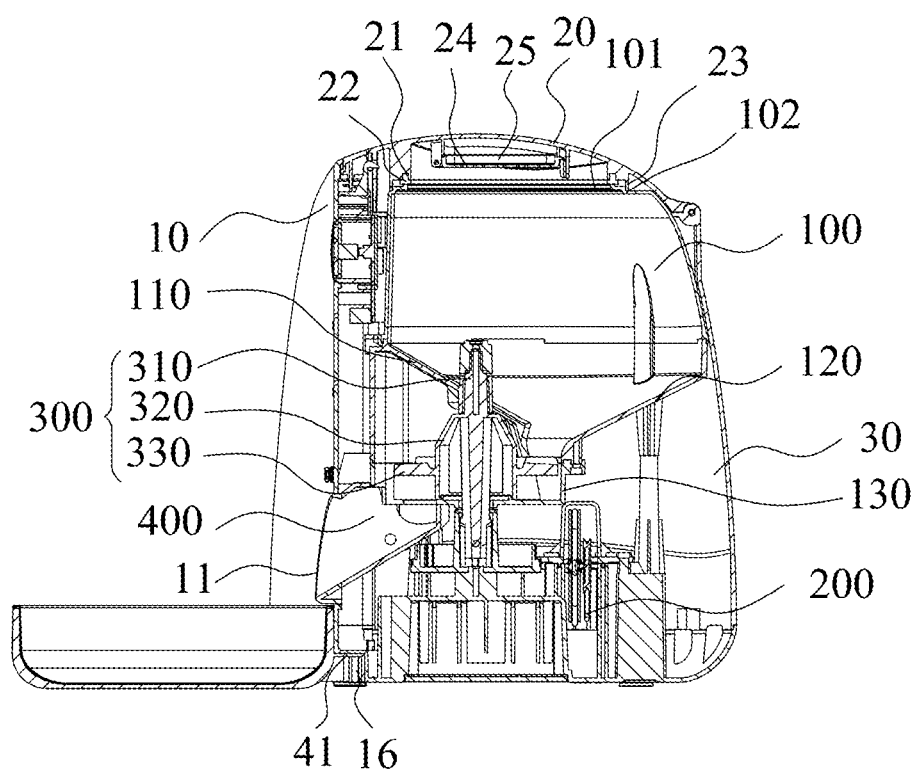
FIG. 3 is a sectional view along the A-A line in FIG. 2.

Referring to FIG. 1, FIG. 2 and FIG. 3, the present invention provides an anti-stuck pet feeder, which includes a shell 10 and a top cover 20 covered on the top of the shell 10, the shell has a cavity 30. Its bottom of the shell 10 is provided with an outlet 11. The upper part of the cavity 30 is provided with a grain storage chamber 100, and the lower part of the cavity 30 is provided with a driving mechanism 200. The lower part of the grain storage chamber 100 is provided with a rotor 300. The rotor 300 includes a shaft 310 and a main body 320 arranged on the shaft 310, the side wall of the main body 320 is uniformly distributed with a plurality of blades 330. The grain storage chamber 100 is provided with a grain-out channel 400 below the blades 330, which communicates with the outlet 11. The driving mechanism 200 is connected with the rotor 300 and drives it to rotate, and the grain stored in the grain storage chamber 100 is transported to the grain-out channel 400 and fed through the outlet 11.

The top cover 20 is covered on the shell 10, the covering mode may be either a clasp connection or a thread connection. In the embodiment shown in FIG. 1, the two are clasped connections, and one side of the top cover 20 and the shell 10 is pivoted through a first shaft 12 to facilitate the opening of the top cover 20.

Figure 4:
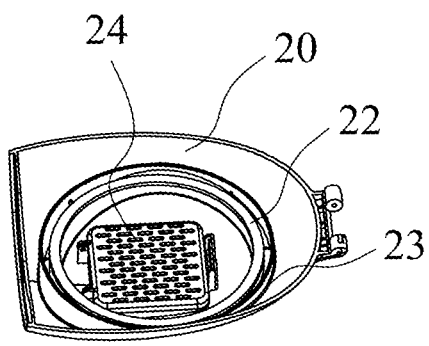
FIG. 4 is a perspective view of the top cover of the anti-stuck pet feeder according to the present invention.

Referring to FIG. 3 and FIG. 4, the grain storage chamber 100 is arranged at its upper portion of the cavity 30. The top of the grain storage chamber 100 is provided with an opening 101. The top cover 20 is provided with a sealing groove 21, and a sealing ring 22 is inserted in the sealing groove 21 and matched with it. When the top cover 20 is covered on the shell 10, the sealing ring 22 surrounds the periphery of the opening 101 to seal the inner cavity of the grain storage chamber 100, thereby keeping the food in the grain chamber 100 dry.

Referring to FIG. 3 and FIG. 4, in embodiments of the invention, the top of the grain storage chamber 100 is also provided with a step wall 102, and the top cover 20 is provided with a ring wall 23 corresponding to the step wall. When the top cover 20 is covered on the shell 100, the ring wall 23 is attached to the step wall 102, thereby further isolating the inner cavity of the external grain storage chamber 100 and ensuring that the food is dry.

Referring to FIG. 3 and FIG. 4, in embodiments of the present invention, the top cover 20 is provided with a mesh plate 24 which can be opened and closed, a chamber 25 is formed between the mesh plate 24 and the top cover 20, the chamber 25 is used for placing desiccant. Specifically, the lower surface of the top cover 20 is provided with a groove, and the mesh plate 24 covers the groove to form the chamber 25. One side of the mesh plate 24 is pivoted on the groove wall through the shaft pin and the pin hole, and the opposite side is connected by the buckle and the buckle slot. When the mesh plate 24 needs to be opened, the buckle is detached from the buckle slot, and the mesh plate 24 is rotated around the shaft pin, which can be opened and the desiccant can be removed or put in. When the mesh plate 24 needs to be closed, the buckle is connected to the buckle slot. The desiccant further adsorbs the moisture in the grain storage chamber and keeps the food dry.

In embodiments of the invention, a button assembly 50 is arranged between the top cover 20 and the shell 10. The button assembly 50 is pressed to control the switch of the top cover 20 to lock or open the top cover 20. The shell 10 is provided with a button slot in which the button assembly 50 is accommodated. The button assembly 50 has a general conventional structure, which is a well-known technology that should be known to technicians in the field, and it is not limited in the invention.

Referring to FIG. 1, in embodiments of the present invention, the shell 10 has a side wall 13 and a front side wall 14. The top cover 20 is covered on the side wall 13, and the two are matched with the front side wall 14 to form the cavity 30. The button assembly 50 is arranged between the top cover 20 and the top of the front side wall 14. The side wall 13 and the front side wall 14 are fixedly connected, and the connection mode of the two can be screw connection, clamping, riveting, etc.

In embodiments of the invention, the front side wall 14 is provided with a manual feeding button 15. The manual feeding button 15 can control the driving mechanism 200 to turn on or off, thereby realizing grain feeding and stopping grain feeding.

In embodiments of the invention, the outlet 11 is arranged in the lower part of the front side wall. Preferably, a food plate 40 is arranged below the outlet 11 to take the grain released from the outlet 11.

Preferably, the front side wall 14 is arranged as an arc surface, and the food plate 40 is also arranged as a circle, so that the food plate 40 can be fitted with the front side wall 14 to prevent the grain from being exposed outside the food plate 40, and the pet feeder is beautiful in shape. Preferably, referring to FIG. 3, the plate 40 and the front side wall 14 are provided with matching clasps 41 and slot 16, respectively. Through the combination of the clasp 41 and the slot 16, the plate 40 is fixed on the front side wall 14 to prevent the pet from moving the plate 30 during the eating process.

Referring to FIG. 5, FIG. 6, FIG. 7 and FIG. 8, the lower part of the grain storage chamber 100 is arranged in a heterosexual funnel shape and has a blanking gentle slope 110, one side of which is provided with a inclined straight slope 120, and the bottom of the inclined straight slope 120 and that of the blanking gentle slope 110 extend downward to form a grain discharging cylinder 130. The blanking gentle slope 110 and the inclined straight slope 120 are conducive to the grain falling into the grain discharging cylinder 130. The side part of the grain discharging cylinder 130 is provided with an outer convex part 131, and the top of the cylinder wall is tilted downward from the inclined straight slope 120 to the blanking gentle slope 110 direction, which is connected with the bottom of the inclined straight slope 120 and the bottom of the blanking gentle slope 110, respectively.

The bottom surface of the grain storage chamber 100 is a cylindrical bottom surface of the grain discharging cylinder 130, and the bottom surface of the grain storage chamber 100 is provided with a central hole 105.

Referring to FIG. 3, the bottom surface of the grain discharging cylinder 130 is communicated with the grain-out channel 400. Specifically, one end of the grain-out channel 400 is connected with the bottom surface of the grain discharging cylinder, the other end is connected with the outlet on the side of the shell 100. Specifically, the outlet is arranged in the front side wall 14.

Figure 5:
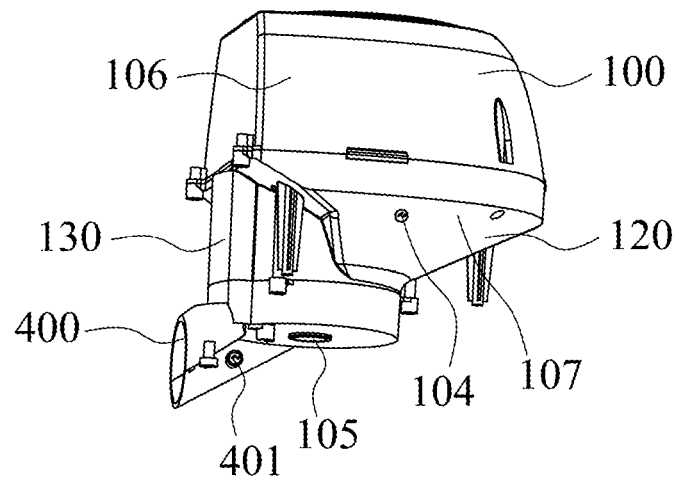
FIG. 5 is a composite view of the grain storage chamber and the grain-out channel according to the present invention.

It should be understood that the grain storage chamber 100 can be designed as a whole or in a split design. Referring to FIG. 5, the grain storage chamber 100 includes an upper shell 106 and a lower shell 107. In order to facilitate the installation of other parts, the split design is selected. Referring to FIG. 5, the grain storage chamber 100 at this time includes an upper shell 106 and a lower shell 107. The opening 101 is arranged at the top of the upper shell 106. The lower shell 107 is arranged in the funnel shape. The connection mode of the upper shell 106 and the lower shell 107 may be clamped, screw connection, etc.

Preferably, the grain storage chamber 100 is provided with a grain detecting element 104, the shell is provided with a Indicator 108, the grain detecting element 104 and the indicator 108 are electrically connected, the detecting result can be showed by the indicator 108.

The grain-out channel 400 is provided with a jammed grain detecting element 401, and the jammed grain detecting element 401 is electrically connected with the jammed grain indicator 109, and the detecting result is displayed through the jammed grain indicator 109.

Figure 6:
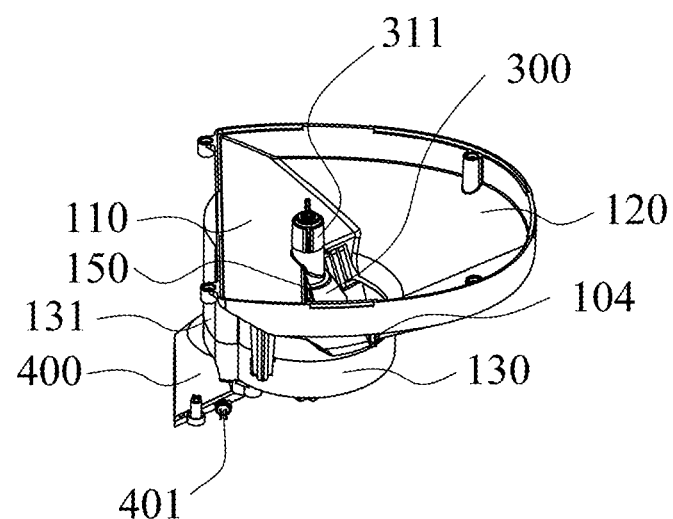
FIG. 6 is a composite view of the lower part of the grain storage chamber and the grain-out channel according to the present invention.
Figure 7:
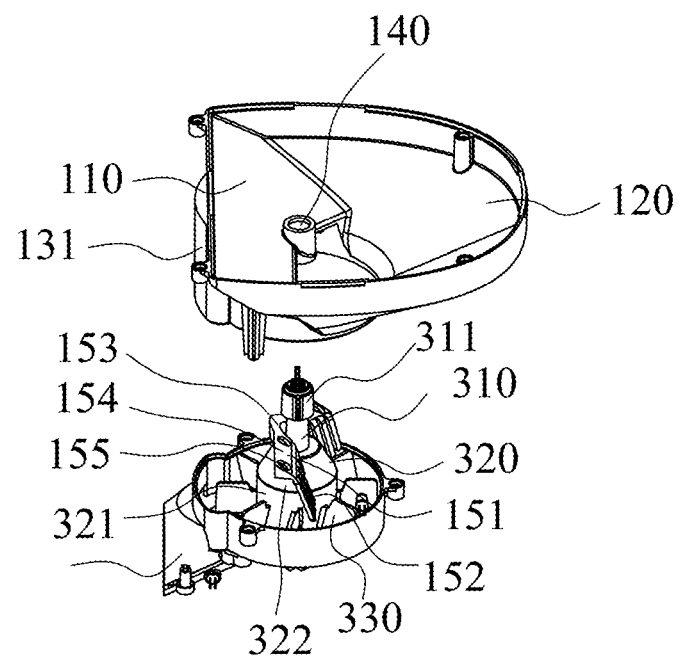
FIG. 7 is a decomposition view of FIG. 6.
Figure 9:
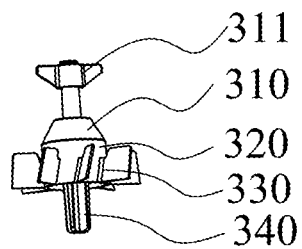
FIG. 9 is perspective view of the rotor of the anti-stuck pet feeder according to the present invention.

Referring to FIG. 6, FIG. 7 and FIG. 9, the main body 320 of the rotor 300 has a cylindrical part 321 and an inverted conical top 322 arranged at the cylindrical part 321. The blades 330 are evenly arranged on the side wall of the cylindrical part 321. The inverted conical top 322 facilitates to guide the food to fall between the blades 320.

The main body 320 is contained in the grain discharging cylinder 130. The grain enters the grain discharging cylinder 130 and is scattered between the blades 330. The lower end of the shaft 310 is connected to the driving mechanism 200 through the center hole 105. The driving mechanism 200 is arranged outside the grain storage chamber 100 to prevent the grain from falling into the driving mechanism 200 and to affect the operation of the driving mechanism 200.

The grain storage chamber 100 is provided with a positioning hole 140. Specifically, the positioning hole 140 is arranged on the inclined straight scope 120. The upper end of the shaft 310 is rotated and mounted on the positioning hole 140. Specifically, the upper end of the shaft 310 is provided with a stopper 311 with symmetrically arranged two wings, the upper end of the shaft 310 passes through the positioning hole 140, and the shaft 310 is prevented from falling out of the positioning hole 140 by the stopper 311. The structure makes the rotor more stable when it rotates and prevents the anti-stuck pet feeder from jitter.

Referring to FIG. 6 and FIG. 7, the grain storage chamber 100 is fixedly provided with an anti-stuck comb 150. The anti-stuck comb 150 has a comb back 151 and comb teeth 152 arranged on the comb back, and the free end of the comb teeth 152 face to the blades 130 and is close to them. When the rotor 300 is rotated, the comb teeth 152 hinder the passage of grain scattered over the blades 130, flattening the grain between the blades 130, thereby controlling the grain quantity and preventing the grain from being jammed.

The middle part of the comb back 151 is an arc part 153. Both sides of the arc part 153 extend a straight part 154 respectively. The straight part 154 extends downwards to form the comb teeth 152. The section of the straight part 154 is triangular. The comb teeth 152 are arranged linearly on the straight part 154, and the angle between the comb teeth 152 and the straight part 154 is preferably 90°-135°.

Figure 8:
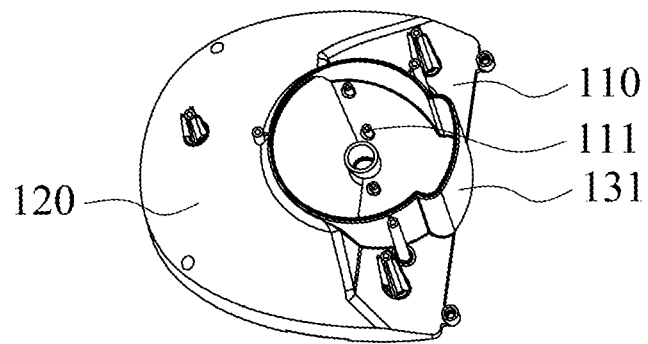
FIG. 8 is the other perspective view of the lower part of the grain storage chamber shown in FIG. 6, for the clarity of the view, the view removes the grain discharge cylinder.

Referring to FIG. 7 and FIG. 8, the straight part 154 and the inclined straight slope 110 are provided with buckle 111 and slot 155 matching with each other, respectively, thereby fixing the anti-stuck comb 150 below the inclined straight slope 110. Specifically, the straight part is provided with a slot, and the inclined straight slope is provided with a buckle, and the buckle is inserted into the slot so that the anti-stuck comb is fixed below the straight part. It should be understood that the buckle may also be arranged on the straight part, and the slot is arranged on the inclined straight slope.

The arc part 153 of the anti-stuck comb 150 is bridged over the main body part 320 around the shaft 310 so that the comb teeth 152 are distributed on both sides of the main body 320. Preferably, the comb teeth 152 are located above the blades 130 at a vertical distance of 3-10 mm from the blades 330, thereby preventing the comb teeth 152 from obstructing the rotation of the blades 330.

The grain is accumulated in the grain discharging cylinder 130 and scattered between the leaves 330. When there is more grain, the grain is accumulated, and the height of the accumulated grain exceeds the blades 330. When the driving mechanism 200 drives the rotor 300 to rotate, the blades 330 push the grain to rotate to the grain-out channel 400. The anti-stuck comb 150 prevents the grain higher than the blades 330 from passing, flattening the grain between the two adjacent blades of the anti-stuck comb 150, thereby controlling the amount of grain released. When the grain rotates to the grain-out channel 400, it falls to the outlet 11. This structure realizes the control of grain output, prevents too much grain from being jammed in the grain-out channel 400.

Referring to FIG. 10, FIG. 11, FIG. 12 and FIG. 13, the driving mechanism 200 drives the rotor 300 to rotate. The driving mechanism 200 includes a motor 210, a pulley group 220, a vortex rod 230 and a turntable assembly 240. The motor 210 drives the pulley group 220, and the pulley group 220 drives the vortex rod 230 to rotate. The vortex rod 230 drives the turntable assembly 240 to rotate. The turntable assembly 240 is connected with the 300 and drives it to rotate.

The turntable assembly 240 includes a turntable 241, its periphery of the turntable 241 is provided with grinding teeth 242. The middle of the turntable 241 is provided with a matching cylinder 243. The matching cylinder 243 is evenly distributed along its length and diameter with a vertical convex edge 244. The lower end of the shaft 310 is set in a criss-cross shape. The lower end of the shaft 310 is inserted into the matching cylinder 243 and clamped between the vertical convex edges 244 so that the rotor 300 can be driven when the turntable assembly 240 is rotated.

The turntable 241 engages with the vortex rod 230. Specifically, the vortex rod 230 is arranged on the one side of the turntable 241. The shell 10 is provided with a first mounting frame 14 and a second mounting frame 15 on one side of the turntable, and the two ends of the vortex rod 230 are bridged on the first mounting frame 14 and the second mounting frame 15, respectively.

The bottom surface of the shell 10 is provided with a pulley mounting frame 16. The pulley group 220 is mounted on the pulley mounting frame 16. The pulley group 220 includes a first pulley 221, a second pulley 222 and a third pulley 223. The motor 210 is mounted on the bottom surface of the shell 10. The motor 210 drives the first pulley 221 through a first belt 224. The first pulley 221 is connected with the second pulley 222 through a wheel shaft 225, which is mounted on the pulley mounting frame 16. The second pulley 222 and the third pulley 223 drive the third pulley 223 through a second belt 226, and the third pulley 223 is mounted on the vortex rod 230.

Preferably, the shell 10 is also provided with a protective cover 250, the protective cover 250 is bridged on the pulley mounting frame 16, and the third pulley 223 and the vortex rod 230 are covered.

The bottom surface of the shell is also provided with a permeable hole to keep the gas in the shell unobstructed and to prevent food corruption.

Figure 10:
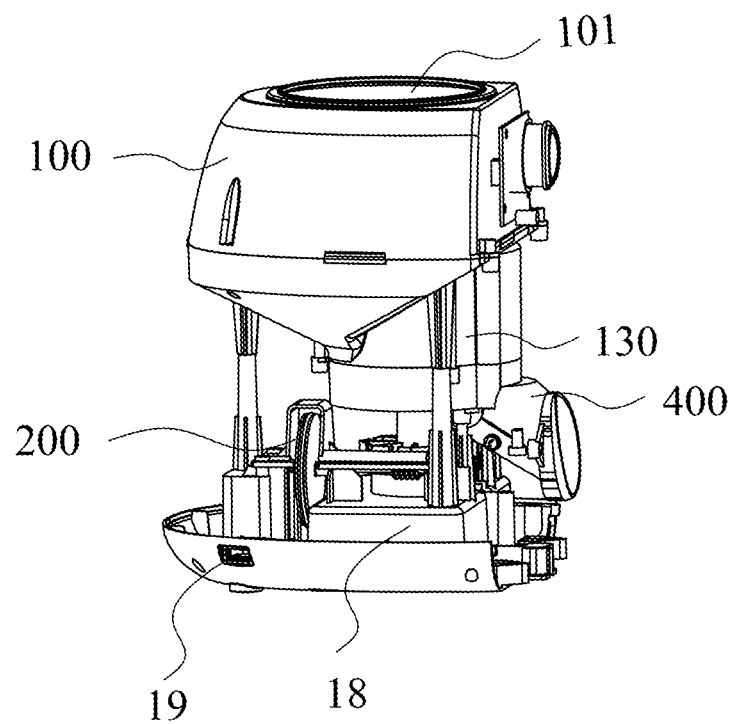
FIG. 10 is a composite view of the grain storage chamber, the driving mechanism, the grain-out channel and the bottom of the shell of the anti-stuck pet feeder according to the present invention.
Figure 11:
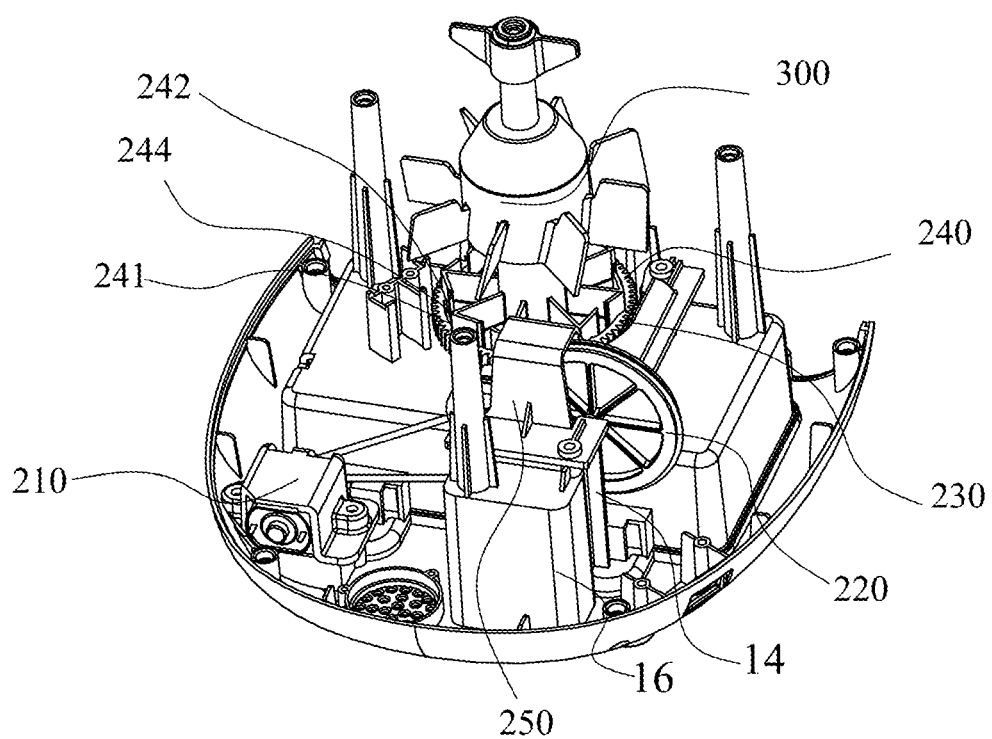
FIG. 11 is a composite view of the driving mechanism, the rotor and the bottom of the shell of the anti-stuck pet feeder according to the present invention.
Figure 12:
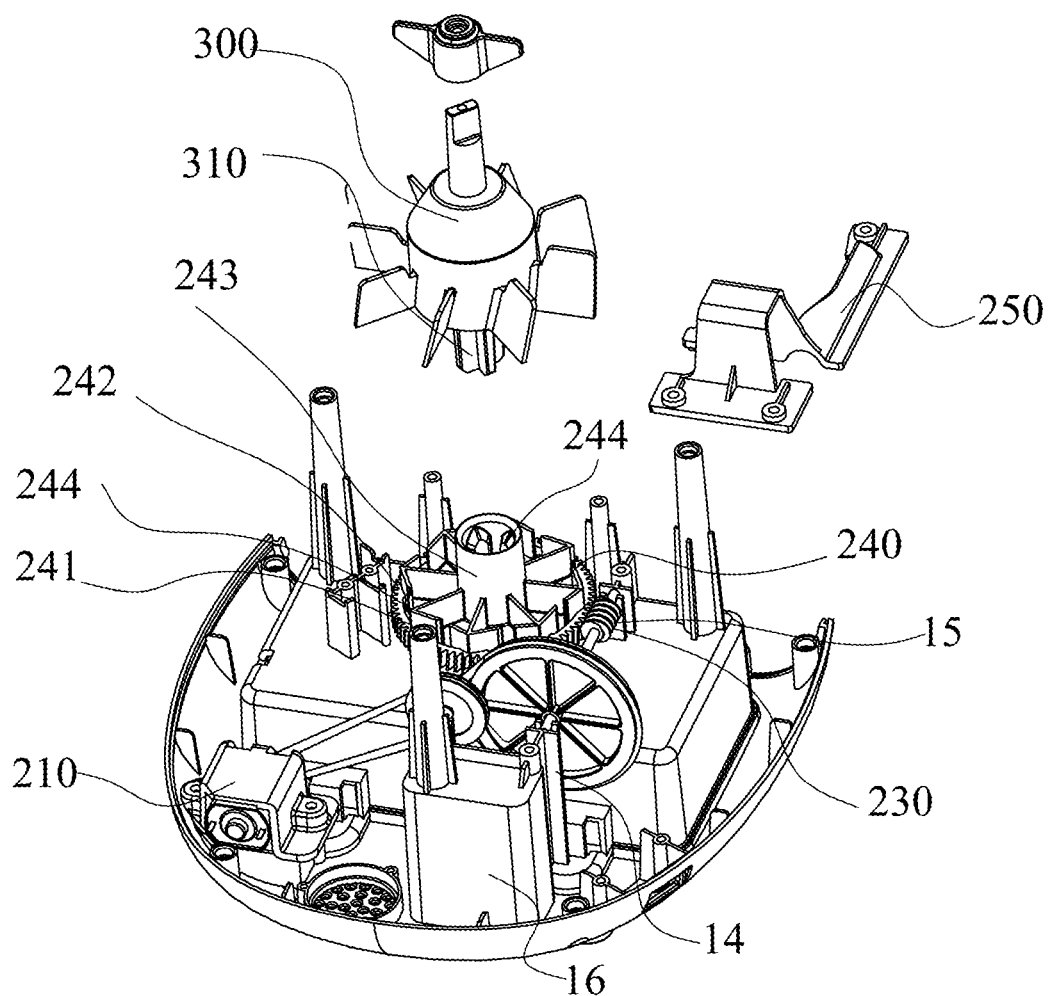
FIG. 12 is a decomposition view of FIG. 11.
Figure 13:
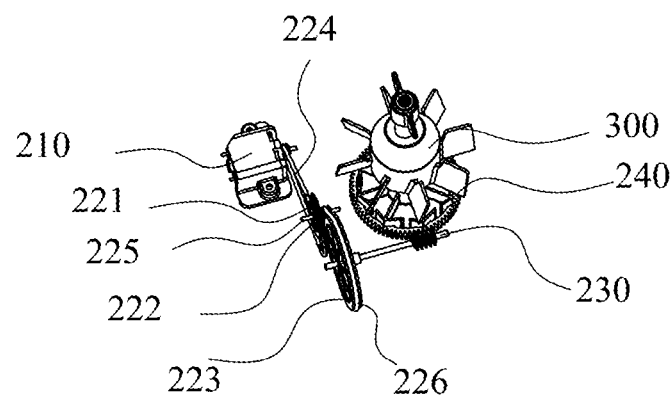
FIG. 13 is a composite view of the driving mechanism and the rotor of the anti-stuck pet feeder according to the present invention.

Referring to FIG. 10, the shell is also provided with a battery chamber. The battery is placed in the battery chamber and supplies power to the driving mechanism. Preferably, the shell is also provided with a USB interface for connecting power.

The above is a further detailed description of the invention in combination with a specific preferred embodiment, and it cannot be concluded that the specific implementation of the invention is limited to these instructions. For the general technical personnel in the technical field to which the invention belongs, without being separated from the conception of the invention, the architecture form can be flexible and changeable, and a series of products can be derived. If it is just making a number of simple deductions or substitutes should be regarded as falling within the scope of patent protection determined by the claim submitted by the present invention.

What is claimed is:

1. An anti-stuck pet feeder, including a shell and a top cover covered on a top of the shell, said shell has a cavity; a bottom of said shell is provided with an outlet, wherein an upper part of said cavity is provided with a grain storage chamber, and a lower part of said cavity is provided with a driving mechanism; a lower part of said grain storage chamber is provided with a rotor; said rotor includes a shaft and a main body arranged on said shaft, a side wall of said main body is uniformly distributed with a plurality of blades; said grain storage chamber is provided with a grain-out channel below said blades, which communicates with said outlet; said driving mechanism is connected with said rotor and drives it to rotate, grain stored in said grain storage chamber is transported to said grain-out channel and fed through said outlet;

said grain storage chamber is internally fixedly provided with an anti-stuck comb; said anti-stuck comb has a comb back and comb teeth arranged on said comb back, and a free end of each of said comb teeth faces to said blades and is close to said blades;

wherein said driving mechanism includes a motor, a pulley group, a vortex rod and a turntable assembly; said motor drives said pulley group, and said pulley group drives said vortex rod to rotate; said vortex rod drives said turntable assembly to rotate; said turntable assembly is connected with said rotor and drives said rotor to rotate;

wherein said vortex rod is arranged on one side of said turntable assembly and engages with said turntable assembly; said shell is provided with a first mounting frame and a second mounting frame, and two ends of the vortex rod are bridged on said first mounting frame and said second mounting frame, respectively;

wherein said bottom surface of said shell is provided with a pulley mounting frame; said pulley group is mounted on said pulley mounting frame; said pulley group includes a first pulley, a second pulley and a third pulley; said motor is mounted on said bottom surface of said shell; said motor drives said first pulley through a first belt; said first pulley is connected with said second pulley through a wheel shaft, which is mounted on said pulley mounting frame; said second pulley and said third pulley drive said third pulley through a second belt, and said third pulley is mounted on said vortex rod.

2. The anti-stuck pet feeder according to claim 1, wherein said grain storage chamber is provided with a grain detecting element, said shell is provided with an indicator, said grain detecting element and said indicator are electrically connected.

3. The anti-stuck pet feeder according to claim 1, wherein a top of said grain storage chamber is provided with an opening; said top cover is provided with a sealing groove, and a sealing ring is inserted in said sealing groove and matched with said sealing groove; when said top cover is covered on said shell, said sealing ring surrounds a periphery of said opening to seal said grain storage chamber.

4. The anti-stuck pet feeder according to claim 1, wherein said top cover is provided with a mesh plate which can be opened and closed, a chamber is formed between said mesh plate and said top cover, said chamber is used for placing desiccant.

5. The anti-stuck pet feeder according to claim 1, wherein said grain-out channel is provided with a jammed grain detecting element.

6. The anti-stuck pet feeder according to claim 1, wherein a middle part of said comb back is an arc part; both sides of said arc part extend a straight part respectively, said straight part extends downwards to form said comb teeth;

said arc part is bridged over said main body around said shaft so that said comb teeth are distributed on both sides of said main body.

7. The anti-stuck pet feeder according to claim 6, wherein a section of said straight part is triangular, said straight part and said inclined straight slope are provided with buckle and slot matching with each other, respectively, thereby fixing said anti-stuck comb below said inclined straight slope.

8. The anti-stuck pet feeder according to claim 1, wherein a lower part of said grain storage chamber has a blanking gentle slope and an inclined straight slope, and a bottom of said inclined straight slope and that of said blanking gentle slope extend downward to form a grain discharging cylinder; a bottom surface of said grain storage chamber is provided with a central hole; said bottom surface is communicated with said grain-out channel.

9. The anti-stuck pet feeder according to claim 8, wherein said main body is contained in said grain discharging cylinder; a lower end of said shaft is connected with said driving mechanism through a center hole, said inclined straight slope is provided with a positioning hole; an upper end of said shaft is rotatably mounted on said positioning hole.

10. The anti-stuck pet feeder according to claim 1, wherein said turntable assembly includes a turntable, a periphery of said turntable is provided with grinding teeth, a middle of the turntable is provided with a matching cylinder; said matching cylinder is evenly distributed with vertical convex edges along said matching cylinder's length and diameter; a lower end of the shaft is designed as a criss-cross shape; a lower end of said shaft is inserted into said matching cylinder and clamped between the vertical convex edges so that said rotor can be driven when said turntable assembly is rotated.

11. The anti-stuck pet feeder according to claim 1, wherein said shell is also provided with a protective cover, said protective cover is bridged on said pulley mounting frame to cover said third pulley and said vortex rod.

12. The anti-stuck pet feeder according to claim 1, wherein said shell is also provided with a battery chamber used for placing battery.

13. The anti-stuck pet feeder according to claim 1, wherein said shell is also provided with a USB interface used for connecting power.

14. The anti-stuck pet feeder according to claim 1, wherein said shell has a side wall and a front side wall; said top cover is covered on said side wall, and said top cover and said side wall are matched with said front side wall to form said cavity.

15. The anti-stuck pet feeder according to claim 14, wherein said outlet is arranged in a lower part of said front side wall; a food plate is arranged below said outlet.

* * * * *